US008577020B2

(12) United States Patent
Hosoi

(10) Patent No.: US 8,577,020 B2
(45) Date of Patent: Nov. 5, 2013

(54) COMMUNICATION TERMINAL APPARATUS

(75) Inventor: Hideaki Hosoi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1049 days.

(21) Appl. No.: 12/588,237

(22) Filed: Oct. 8, 2009

(65) Prior Publication Data

US 2010/0091962 A1    Apr. 15, 2010

(30) Foreign Application Priority Data

Oct. 9, 2008    (JP) ................................. 2008-262728

(51) Int. Cl.
*H04M 1/00*    (2006.01)
*H04M 3/00*    (2006.01)

(52) U.S. Cl.
USPC ..................... 379/418; 379/88.13; 379/93.09; 379/100.16; 379/207.16; 379/257; 379/372; 379/373.02; 379/386

(58) Field of Classification Search
USPC ................... 379/386, 418, 372, 257, 373.02, 379/207.16, 88.13, 93.09, 100.16
See application file for complete search history.

(56) References Cited

U.S. PATENT DOCUMENTS

| 5,280,519 | A |   | 1/1994 | Nakajima et al. |
| 5,323,451 | A | * | 6/1994 | Yatsunami ............... 379/100.01 |
| 5,377,257 | A | * | 12/1994 | Shirasaka et al. ............ 379/67.1 |
| 5,655,011 | A | * | 8/1997 | Brown ....................... 379/93.06 |
| 6,173,054 | B1 | * | 1/2001 | Beyda et al. .................. 379/386 |
| 6,278,775 | B1 | * | 8/2001 | Sih et al. .................. 379/100.17 |
| 6,574,335 | B1 | * | 6/2003 | Kalmanek et al. ............ 379/386 |
| 6,614,889 | B2 | * | 9/2003 | Perkins ...................... 379/93.09 |
| 6,968,045 | B1 | * | 11/2005 | Cannon et al. ............. 379/93.09 |
| 7,127,048 | B2 | * | 10/2006 | Bremer et al. ............. 379/93.09 |
| 2001/0046281 | A1 | * | 11/2001 | Perkins ...................... 379/93.09 |
| 2003/0016795 | A1 | * | 1/2003 | Brandenberger .......... 379/93.11 |

FOREIGN PATENT DOCUMENTS

| JP | 05-268443 A | 10/1993 |
| JP | 08-251371 A | 9/1996 |
| JP | 10-032644 A | 2/1998 |
| JP | 2002-281265 A | 9/2002 |

* cited by examiner

*Primary Examiner* — Lisa Hashem
(74) *Attorney, Agent, or Firm* — Rabin & Berdo, P.C.

(57) ABSTRACT

A communication terminal apparatus is connected to a single telephone line and is configured to be selectively connected either to a telephone set or to a facsimile machine. A pseudo ring back tone generator generates a repetitive pseudo ring back tone transmitted to a calling party in response to an incoming call. A pseudo ring signal generator generates a pseudo ring signal for driving a ringer of the telephone set to ring in response to the incoming call. A tone detector detects a CNG signal indicative that the incoming call is a facsimile. A controller controls at least the pseudo ring back tone generator and the pseudo ring signal generator. A table correlates a plurality of ring back tones with corresponding countries. If a ring back tone for a country meets a predetermined condition, the controller sets a predetermined pseudo ring back tone to the pseudo ring back tone generator.

5 Claims, 10 Drawing Sheets

FIG.8A

| GROUP | ON (SEC) | OFF(SEC) | PERIOD (SEC) | COUNTRY/AREA |
|---|---|---|---|---|
| 1 | 0.4ON→0.2OFF →0.4ON→2OFF | | 3 | IRELAND, SINGAPORE U.K., NORTH IRELAND, AUSTRALIA, BAHRAIN, BOTSWANA, CAMBODIA, FUJI, INDIA, MALAYSIA, MALDIVES, NAMIBIA, NEW ZEELAND, OMAN, PAPUA NEW GUINEA, SOUTH AFRICA, SRILANKA |
| 2 | 0.4ON→0.2OFF →0.4ON→3OFF | | 4 | HONG KONG |
| 3 | 0.4 | 2.6 | 3 | BHUTAN |
| 4 | 0.4 | 4 | 4.4 | TURKMENISTAN |
| 5 | 0.8 | 3.2 | 4 | BELARUS, KIRGHIZ, RUSSIA, TADZHIKISTAN |
| 6 | 1 | 1 | 2 | SURINAME |
| 7 | 1 | 2 | 3 | JAPAN, SOUTH KOREA, TAIWAN, PAKISTAN |
| 8 | 1 | 3 | 4 | BELGIUM, CHILE, ISRAEL |
| 9 | 1 | 4 | 5 | NETHERLAND, NORWAY, SWITZERLAND, GERMAN, ALBANIA, ARGENTINA, BANGLADESH, BRAZIL, CHINA, CROATIA, CUBA, CZECH, DENMARK, ESTONIA, ETHIOPIA, FINLAND, GHANA, GREECE, GREENLAND, HONDURAS, ICELAND, INDONESIA, IRAN, ITALY, JORDAN, KUWAIT, LATVIA, LEBANON, LIBERIA, LITHUANIA, MACAO, MALTA, MAURITIUS, MEXICO, NAURU, PARAGUAY, PHILIPPINES, POLAND, SLOVAKIA, SLOVENIA, SUDAN, THAILAND, MACEDONIA, UGANDA, URUGUAY, VANUATU, VENEZUELA, YEMEN, ZAMBIA, ZIMBABWE |
| 10 | 1 | 4.5 | 5.5 | COLUMBIA |
| 11 | 1 | 5 | 6 | SWEDEN, ANGOLA, AUSTRIA, MOZAMBIQUE, PORTUGAL, SYRIA |
| 12 | 1 | 9 | 10 | YUGOSLAVIA |
| 13 | 1.1 | 3.1 | 4.2 | NEPAL |

FIG.8B

| GROUP | ON (SEC) | OFF(SEC) | PERIOD (SEC) | COUNTRY/AREA |
|---|---|---|---|---|
| 14 | 1.2 | 4.6 | 5.8 | EL SALVADOR, SAUDI ARABIA |
| 15 | 1.2 | 4.65 | 5.85 | ECUADOR, PANAMA, TUNISIA |
| 16 | 1.2 | 4.9 | 6.1 | COSTA RICA |
| 17 | 1.52 | 3.75 | 5 | HUNGARY |
| 18 | 1.5 | 3 | 4.5 | CYPRUS, MALI, SPAIN |
| 19 | 1.5 | 3.5 | 45 | FRANCE, ALGERIA, GUIANA |
| 20 | 1.7 | 3.3 | 5 | CAMEROON, CENTRAL AFRICA, CHAD, COTE D'LVOIRE, POLYNESIA, MADAGASCAR, MOROCCO, NEW CALEDONIA, NIGER, RWANDA, SENEGAL |
| 21 | 1.85 | 4,15 | 6 | ROMANIA |
| 22 | 2 | 1 | 3 | EGYPT |
| 23 | 2 | 4 | 6 | CANADA, USA, BAHAMAS, BARBADOS, BERMUDA, VIRGIN ISLANDS, DOMINICA, JAMAICA, MYANMAR, NIGERIA, TRINIDAD AND TOBAGO, TURKEY |

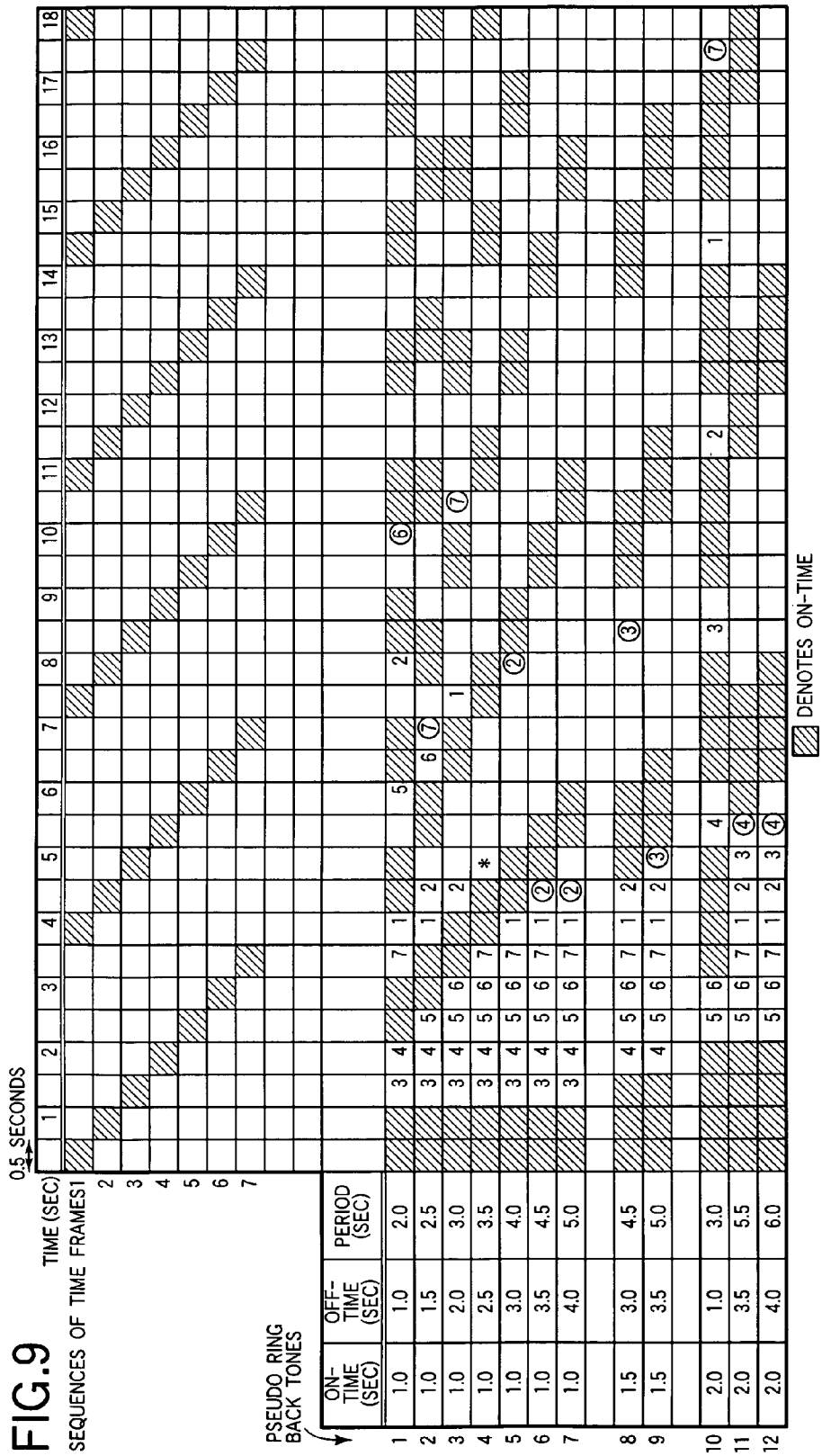

COMMUNICATION TERMINAL APPARATUS

BACKGROUND OF THE INVENTION

1. Field of the Invention

The present invention relates to a communication terminal apparatus that is connected a single telephone subscriber line or a private branch exchange (PBX), and that is capable of automatically switching the telephone subscriber line or the PBX to either a telephone set or to a facsimile machine.

2. Description of the Related Art

Communication terminal apparatuses have been widespread which are connected either to an analog telephone line or to a PBX, and which are capable of sending and receiving facsimile messages. Such communication terminal apparatuses are designed to be connected to a telephone apparatus, and are capable of automatically identifying whether an incoming call is a voice call or a facsimile call so that a single input telephone line maybe shared between voice calls and facsimile calls.

A check may be made to determine whether the incoming call is a voice call or a facsimile call. Upon detection of a CNG signal (Calling Tone, the ITU-T Recommendation) having a frequency of 1100 Hz, which is on for one half of a second and off for three seconds, the apparatus enters a facsimile mode. If the CNG signal is not received, a ringer in the communication terminal apparatus or a ringer in the telephone rings to prompt the user to initiate a voice communication.

Japanese Patent Laid-Open No. 2002-281265 discloses the following technology for preventing an erroneous identification of the CNG signal or for alleviating a calling party's frustration.

(a) The apparatus of a called party sends a pseudo ring back tone which is a dummy ring back tone during the period in which an incoming CNG is watched for. Upon receiving a CNG signal components, the apparatus stops sending the pseudo ring back tone.

(b) If the apparatus does not receive a CNG signal within a predetermined time frame after having stopped sending the pseudo ring back tone in response to the detection of the CNG signal components, then the apparatus resumes sending the pseudo ring back tone.

(c) The period of time during which generation of the pseudo ring back tone is stopped may be selectable.

(d) The conditions under which the CNG signal components are detected may be selectable.

The aforementioned conventional communication terminal apparatus suffers from the following problems. If the called apparatus fails to receive the CNG signal after having stopped sending the pseudo ring back tone in response to the initial CNG signal components, the called apparatus resumes sending the pseudo ring back tone. Therefore, the pseudo ring back tone may not be sent at regular intervals, causing the caller to concern.

Additionally, the pseudo ring back tone may not be generated by the called apparatus in synchronism with the CNG signal. Therefore, the receiving apparatus may fail to detect the CNG signal for a while after it has begun to send out the pseudo ring back tone. Meanwhile, the calling party begins to be charged shortly after the called apparatus has established the dc loop of the called party's telephone line, so that the calling party is charged for a period during which the CNG signal is being watched for. As a result, the longer the CNG signal verification time, the more uneconomical to the caller's apparatus.

SUMMARY OF THE INVENTION

An object of the invention is to shorten the time from when an incoming call is received until a CNG signal is detected.

A communication terminal apparatus is connected to a single telephone line and is configured to be selectively connected either to a telephone set for voice communication or to a facsimile machine for facsimile communication. A pseudo ring back tone generator generates a repetitive pseudo ring back tone transmitted to a calling party in response to an incoming call. A pseudo ring signal generator generates a pseudo ring signal for driving a ringer of the telephone set to ring in response to the incoming call. A tone detector detects a CNG signal indicative that the incoming call is a facsimile. A controller controls at least the pseudo ring back tone generator and the pseudo ring signal generator. A table correlates a plurality of ring back tones with corresponding countries. If a ring back tone for a country meets a predetermined condition, the controller sets a predetermined pseudo ring back tone to the pseudo ring back tone generator and the pseudo ring signal generator.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIGS. 8A and 8B illustrate ring back tones in selected countries; and

FIG. 9 illustrates the relationship between sequences of time frames of CNG signals and ring back tones in the prior art.

DETAILED DESCRIPTION OF THE INVENTION

First Embodiment

The present invention will be described in detail with reference to the accompanying drawings.

Figure 1:
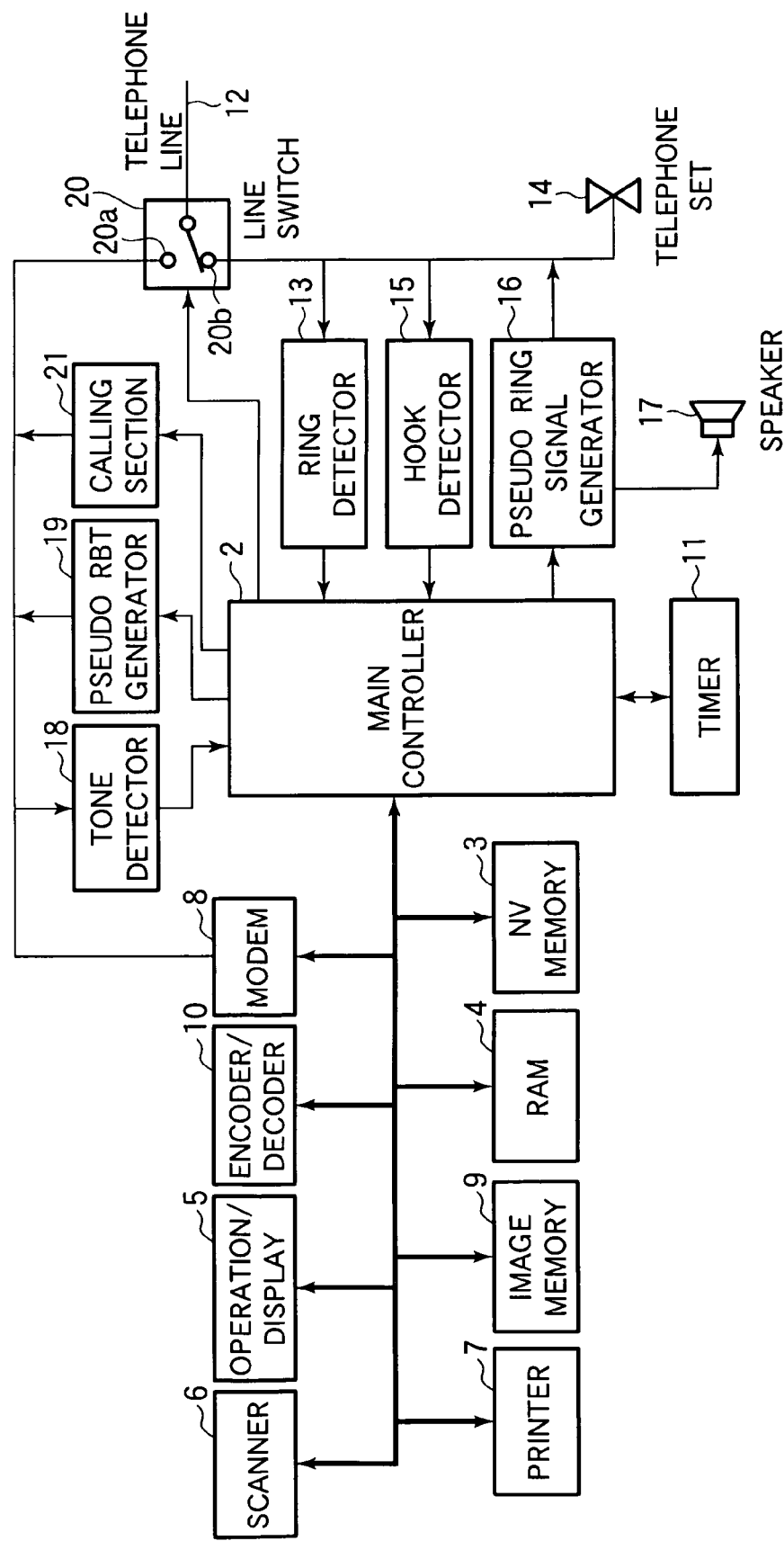
FIG. 1 is a block diagram illustrating the pertinent portion of a communication terminal apparatus of a first embodiment of the invention.

FIG. 1 is a block diagram illustrating the pertinent portion of a communication terminal apparatus of a first embodiment of the invention.

Referring to FIG. 1, a main controller 2 including a CPU communicates with various sections in the communication terminal apparatus 1. An NV memory 3 is a non-volatile memory into which various programs and a data table may be written. The main controller 2 reads the various programs from the NV memory 3, and controls the overall operation of the communication terminal apparatus 1. A volatile memory or RAM 4 stores control data based on which the main controller 2 operates. An operation/display unit 5 includes an operation section from which a user inputs various commands and a display section which displays various items of information to the user. A scanner 6 reads the image of an original document. A modem 8 outputs various tone signals, for example, the CNG signal, and performs modulation and demodulation of data. An image memory 9 holds image data therein. An encoder/decoder 10 encodes or decodes the image data. All of the aforementioned sections are connected to one another via bus lines.

The communication terminal apparatus 1 further includes the following sections. A timer 11 counts up time during which the main controller 2 performs signal processing. A ring detector 13 detects a call signal (ring signal) from an input telephone line 12. A hook detector 15 detects the ON-HOOK/OFF-HOOK states of a telephone set 14 connected to the hook detector 15 through a connection circuit (not shown). A pseudo ring signal generator 16 generates a pseudo ring signal which is a repetitive signal. A speaker 17 emits the call signal. A tone detector 18 detects a variety of tones, for example, the CNG signal. A pseudo ring back tone (RBT) generator 19 generates a pseudo ring back tone which is a repetitive signal. A line switch 20 switches the input telephone line 12 between positions 20a and 20b of the line switch 20. A calling section 21 makes a call.

When the communication terminal apparatus 1 is in the standby state, the input telephone line 12 remains connected to the position 20b of the line switch 20. The pseudo ring signal generator 16 incorporates a timer (not shown) which sets the ON time and OFF time of the pseudo ring signal such that the pseudo ring signal is generated at specific intervals. The pseudo RBT generator 19 also incorporates a timer (not shown) which sets the ON time and OFF time of the pseudo ring back tone such that the pseudo ring back tone is generated at specific intervals.

{Operation of Communication Terminal Apparatus}

The operation of the communication terminal apparatus 1 will be described in terms of facsimile transmission and reception.

Prior to a facsimile transmission, an operator places an original document to be transmitted on the scanner 6, and then inputs the facsimile number of a destination through the operation/display unit 5. The main controller 2 then controls the line switch 20 to couple the telephone line 12 to the position 20a. Then, the main controller 2 controls the calling section 21 to make a call to an exchanger (not shown) via the telephone line 12, and then commands the modem 8 to output a CNG signal.

The image data captured by the scanner 6 is temporarily stored into the image memory 9. Then, the image data is encoded according to a specific coding system such as Modified-Huffman (MH), Modified-Read (MR), or Modified-Modified-Read (MMR), then modulated according to ITU-T recommendation V.34, V17, or V.29, and finally transmitted to the destination (not shown) over the telephone line 12.

When a facsimile is received, a ring signal sent from the exchanger over the telephone line 12 is directed to the detector 13. Upon detecting the ring signal, the detector 13 informs the main controller 2 of the reception of the ring signal. In response to the detection of the ring signal, the main controller 2 controls the line switch 20 to couple the telephone line 12 to the position 20a, thereby establishing a dc loop for call connection, and then controls the pseudo RBT generator 19 to transmit the pseudo ring back tone to the calling party over the telephone line 12, and further controls the pseudo ring signal generator 16 to output the pseudo ring signal, which in turn causes a ringer of the telephone set 14 to ring and/or the speaker 17 to emit the ringing sound.

If the tone detector 18 detects the CNG signal within a predetermined time frame after receiving the call signal (ring signal), the main controller 2 controls the pseudo RBT generator 19 to stop transmitting the pseudo ring back tone and the pseudo ring signal generator 16 to stop outputting the pseudo ring signal, then commands the modem 8 to initiate receiving the facsimile. The modem 8 demodulates a modulated image signal received from the calling party's facsimile apparatus, and demodulated image signal is temporarily stored in the image memory 9. The image signal in the memory 9 is decoded in the encoder/decoder 10 before being printed on a print medium. When the pseudo ring back tone is being sent and the pseudo ring signal is driving the ringer to ring, if the hook detector 15 detects the OFF-HOOK of the telephone set 14, then the main controller 2 stops transmitting the pseudo ring back tone and generating the pseudo ring signal, and then controls the line switch 20 to couple the telephone line 12 to the position 20b, thereby enabling voice communication.

A description will be given of the detection of the CNG signal and the relationship between the pseudo ring back tone and the CNG signal. "Ring back tone" is a tone that is transmitted from the exchanger to the calling communication terminal apparatus, the tone indicating that the exchanger is currently in the process of calling the facsimile apparatus at the receiving end. The pseudo ring back tone is a false tone or pretended tone transmitted from the called communication terminal apparatus in response to the call after having established the dc loop of the telephone line.

FIGS. 8A and 8B illustrate ring back tones in selected countries, each of the ring back tones being a signal having corresponding ON and OFF times. The signal in Group 1 is on for 0.4 sec, off for 0.2 sec, on for 0.4 sec, and off for 2.0 sec. Thus, this signal may be interpreted to look more like a "3-sec signal" which is on for 1.0 sec and off for 2 sec. Likewise, the signal in Group 2 may be interpreted to be more like a "4-sec signal" which is on for 1.0 sec and off for 3 sec. In other words, the ring back tone used in each country has its own ON time and OFF time.

FIG. 9 illustrates the relationship between sequences of time frames of CNG signals and possible types of pseudo ring back tones #1-#12, assuming that the pseudo ring back tones #1-#12 having different ON and OFF times maybe transmitted in response to the CNG signals that may be received at seven different sequences of time frames, #1-#7. The respective signals in FIG. 9 are ON in the hatched areas and OFF in the non-hatched areas. For the ring back tone #4, the sequence of time frames #1 and #2 cannot be detected.

The CNG signal transmitted from the calling party and the pseudo ring back tone transmitted from the called party (apparatus at the receiving end) are usually not in synchronism with each other. Therefore, the occurrence of the CNG signal may deviate in time from that of the pseudo ring back tone as shown in FIG. 9. Additionally, the pseudo ring back tone transmitted from the pseudo RBT generator 19 (FIG. 1) at the receiving apparatus is also directed to the tone detector 18, so that if the CNG signal and the pseudo ring back tone occur simultaneously, i.e., if the hatched areas of the CNG signal overlap with those of the pseudo ring back tone in FIG. 9, the CNG signal cannot be detected during the time frames depicted by the overlapping hatched areas.

For example, Japan, Korea, Taiwan, and Pakistan belong to Group 7 in FIG. 8 and the specified ring back tone is a "3-sec signal" which is on for 1 sec and off for 2 sec. This "3-sec signal" corresponds to pseudo ring back tone #3 in FIG. 9. When the pseudo ring back tone #3 is transmitted, the CNG signal may not be detected for a period of 10.5 sec from the beginning of the transmission of the pseudo ring back tone #3, if the CNG signal is to be received in the sequence of time frames, #7.

The numerals in the respective cells in FIG. 9 represent corresponding sequences of time frames during which corresponding CNG signals could be first received. Therefore, if a communication terminal apparatus that supports the pseudo ring back tone #3 is to receive a CNG signal having a sequence of time frames, #7, the communication terminal apparatus can successfully receive the CNG signal only 10.5 seconds after the CNG signal began to be watched for. Thus, the numeral "7" appears in a time frame or a cell corresponding to a time frame from 10 sec to 10.5 sec. Each of circled numerals denotes a sequence of time frames in which a CNG signal takes the longest time of all sequences of time frames, #1-#7, before that CNG signal is successfully detected.

Thus, if the communication terminal apparatus 1 that supports the pseudo ring back tone #10 (corresponding to Group #22 in FIG. 8B, i.e., Egypt) is to receive a CNG signal having a sequence of time frames #7, the communication terminal apparatus 1 can successfully receive the CNG signal only 17.5 seconds after the CNG signal begins to be watched for as shown in FIG. 9. It is common that a calling party begins to be billed shortly after establishment of the dc loop of the telephone line of a called party. In other words, the calling party is billed from when the CNG signal begins to be watched for until the call is disconnected, so that the longer the time required for the called party to receive a CNG signal, the less economical to the calling party.

The called communication terminal apparatus 1 is configured such that the ringer of the communication terminal apparatus 1 or a telephone set continues to ring until the CNG signal is detected for prompting the user to begin a voice communication. As a result, the longer the time before the CNG signal is detected, the more likely that the user will pick up the handset even if the call is actually a facsimile. In such a case, the user recognizes by hearing the CNG signal through the handset that the incoming call is a facsimile, and then manually switches the communication terminal apparatus to a facsimile reception mode. This is inconvenient to the user.

{Operation of First Embodiment}

Figure 2:
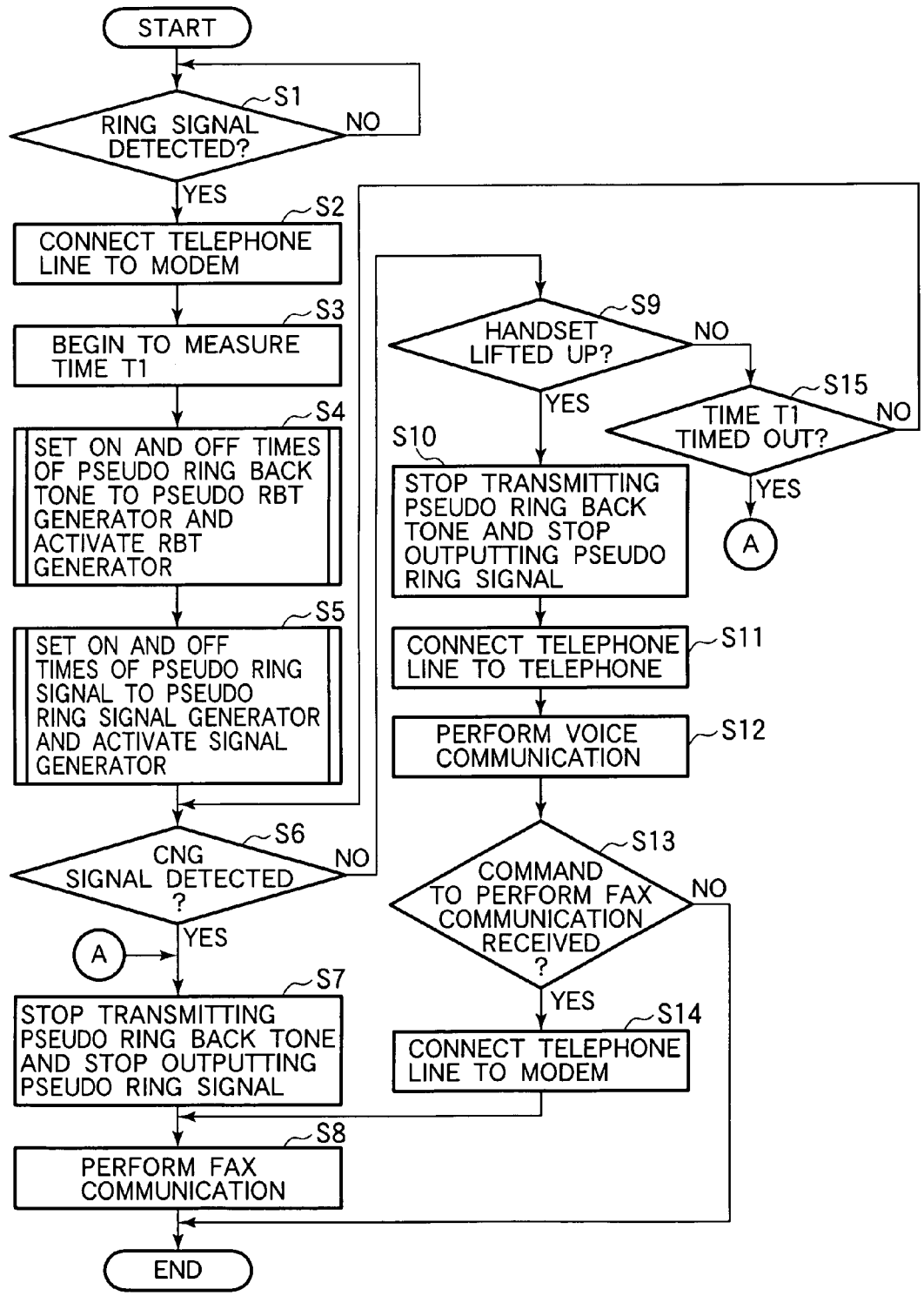
FIG. 2 is a flowchart illustrating the operation in which an incoming call is switched in a communication terminal apparatus.

The operation of the first embodiment will be described. FIG. 2 is a flowchart illustrating the operation in which an incoming call is switched by the communication terminal apparatus 1. The program for executing the flow of operation is stored in the NV memory 3. The main controller 2 reads the program from the NV memory 3 and executes the program.

The operation for switching the incoming call will be described with reference to FIGS. 1 and 2. It is assumed that when the communication terminal apparatus 1 is installed, the information on the country in which the apparatus is used is set by a user or a service man through the operation/display unit 5 and has been resident in the NV memory 3.

A ring signal is watched for when the communication terminal apparatus 1 is in the standby mode in which the telephone line 12 remains connected to the position 20b of the line switch 20 (S1). If the detector 13 detects a ring signal (YES at S1), the main controller 2 controls the line switch 20 to connect the telephone line 12 to the position 20a, i.e.,
modem 8 side (S2), and then the timer 11 initiates counting time to measure a duration T1 during which the CNG signal is watched for (S3). Then, at step S4, the main controller 2 sets the ON and OFF times of the pseudo ring back tone to the pseudo RBT generator 19, and then activates the pseudo RBT generator 19.

{Operation at Step S4}

Figure 3:
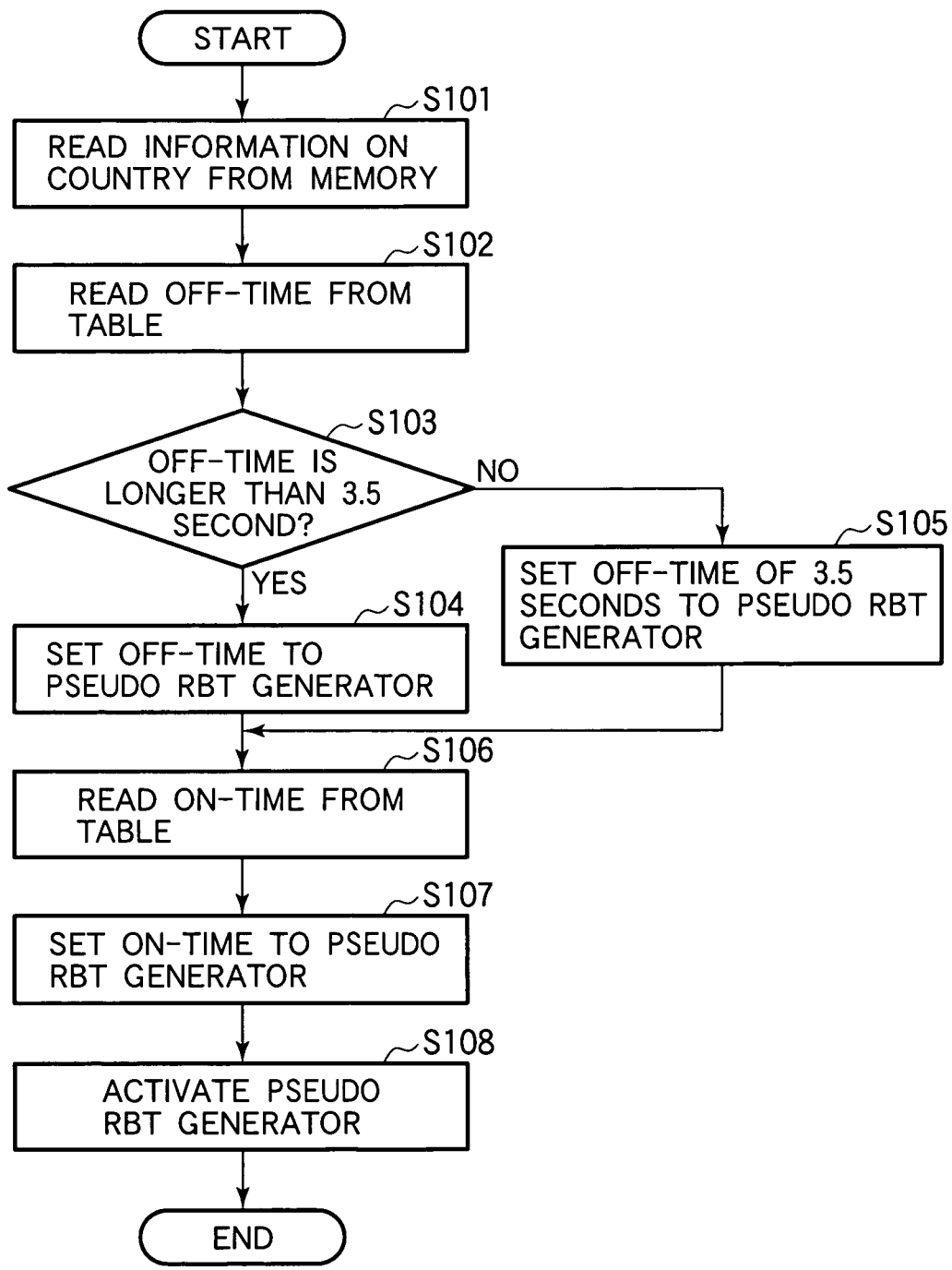
FIG. 3 is a flowchart illustrating the detail of step S4 of FIG. 2.

FIG. 3 is a flowchart illustrating the detail of step S4. The detail of step S4 will be described with reference to the flowchart shown in FIG. 3.

The main controller 2 reads from the NV memory 3 the information on the country in which the communication terminal apparatus 1 is installed (S101), and then searches a ring back tone information table for the OFF time of the ring back tone corresponding to the country by using the information on the country, and then reads the OFF time from the ring back tone information table (S102). The ring back tone information table correlates the ON and OFF times of the ring back tone for each group shown in FIG. 8 with information on the country or area in which the ON and OFF times are used. Such information has been stored in the ring back tone information table at the time of manufacture of the communication terminal apparatus 1.

If the OFF time is equal to or greater than 3.5 seconds (YES at S103), the main controller 2 sets the OFF time to the pseudo RBT generator 19 (S104). If the OFF time is less than 3.5 seconds (NO at S103), the main controller 2 sets a value of 3.5 seconds to the pseudo RBT generator 19 (S105). Then, the main controller 2 searches the ring back tone information table held in the NV memory 3 for the ON time of the pseudo ring back tone, and reads the ON time (S106). Then, the main controller 2 sets the ON time to the pseudo RBT generator 19 (S107). Thereafter, the main controller 2 activates the pseudo RBT generator 19 to transmit the pseudo ring back tone (S108). This completes the detailed operation of step S4.

Referring back to FIG. 2, the main controller 2 sets the ON and OFF times of the pseudo ring to the pseudo ring signal generator 16, and then activates the pseudo ring signal generator 16 at step S5.

{Operation at Step S5}

Figure 4:
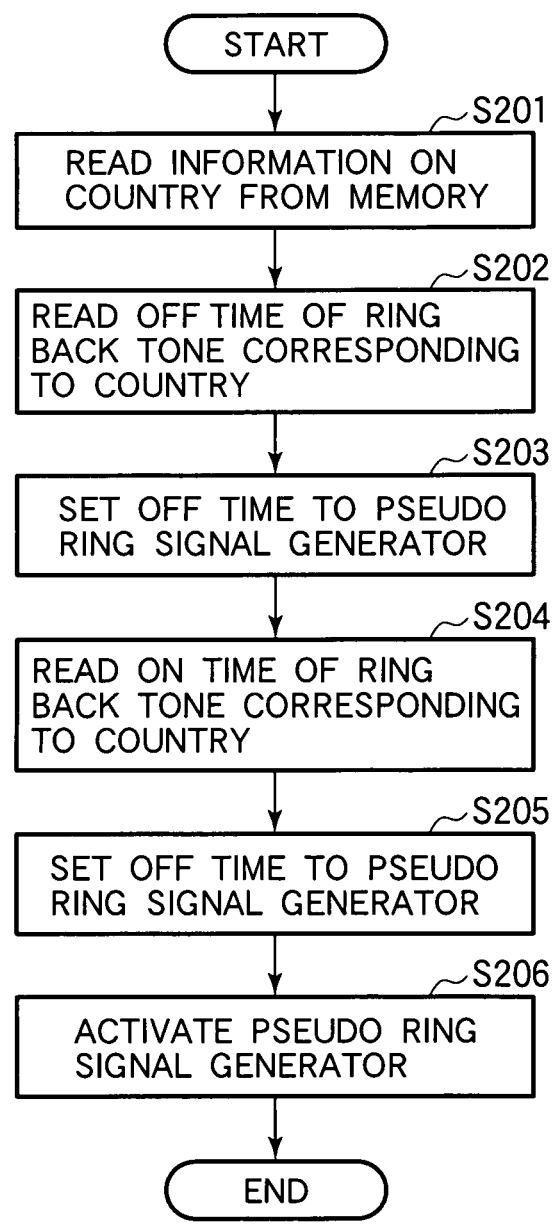
FIG. 4 is a flowchart illustrating the detail of step S5 of FIG. 2.

FIG. 4 is a flowchart illustrating the detail of step S5. The operation of step S5 will be further described with reference to the flowchart shown in FIG. 4.

The main controller 2 reads from the NV memory 3 the information on the country in which the communication terminal apparatus 1 is installed (S201), and then searches a ring back tone information table for the OFF time of the ring back tone corresponding to the country by using the information on the country, and then reads the OFF time (S202) from the ring back tone information table. The main controller 2 sets the OFF time to the pseudo ring signal generator 16 (S203). Then, by using the information on the country, the main controller 2 searches the ring back tone information table for the ON time of the ring back tone corresponding to the country, and then reads the ON time (S204), and then sets the ON time to the pseudo ring signal generator 16 (S205). The main controller 2 then activates the pseudo ring signal generator 16, which in turn outputs the pseudo ring signal to the ringer or a speaker 17 (S206). This completes the operation of step S5.

Referring back to FIG. 2, the main controller 2 begins to watch for a CNG signal (S6). If the detector 18 detects a CNG signal (YES at S6), the main controller 2 controls the pseudo RBT generator 19 to stop transmitting the pseudo ring back tone to the calling apparatus, and controls the pseudo ring signal generator 16 to stop outputting the pseudo ring signal (S7). Then, a facsimile communication is performed in accordance with a predetermined procedure, thereby completing the operation for switching the incoming call to perform facsimile communication (S8).

If the CNG signal is not detected yet (NO at S6), a check is made to determine whether the handset has been lifted from the telephone set 14 (S9). If the handset has been lifted (YES at S9), the main controller 2 controls the pseudo RBT generator 19 to stop transmitting the pseudo ring back tone and controls the pseudo ring signal generator 16 to stop outputting the pseudo ring signal (S10). Then, the main controller 2 controls the line switch 20 to connect the telephone line 12 to the position 20b, i.e., to the telephone set 14 (S11) so that a voice communication may be performed (S12).

The main controller 2 watches for a command to perform a facsimile communication (S13) which may be inputted by the user after the voice communication. The command is usually inputted by depressing a reception start button (not shown). If the command has been received (YES at S13), the main controller 2 controls the line switch 20 to connect the telephone line 12 (S14) to the position 20a (the modem 8 side), then the program proceeds to step S8 where a facsimile communication is performed. If the handset is put down on the telephone set after the voice communication while not receiving a command to perform a facsimile communication (i.e., ON-HOOK) (NO at S13), the program ends.

If the handset is not lifted (NO at S9), the main controller 2 checks the timer 11 to determine whether the duration T1 for watching the CNG signal has timed out (S15). If NO at S15, the program jumps back to S6 to loop through steps S6, S9, and S15, thereby continuing to watch for the CNG signal, the OFF-HOOK of the handset, and time-out of the timer 11.

If the duration T1 has elapsed (YES at S15), the program proceeds to S7 where a facsimile communication is performed. After the duration T1 has elapsed, the facsimile communication is carried out. This is because the communication terminal apparatus may fail to detect a CNG signal for some reason or because the facsimile apparatus may not be configured to transmit a CNG signal. The source facsimile apparatus is usually configured to wait 35 seconds after initiating a call for a facsimile procedure signal sent from a destination facsimile apparatus. Therefore, the duration T1 should preferably be a maximum of 25 seconds.

Figure 5:
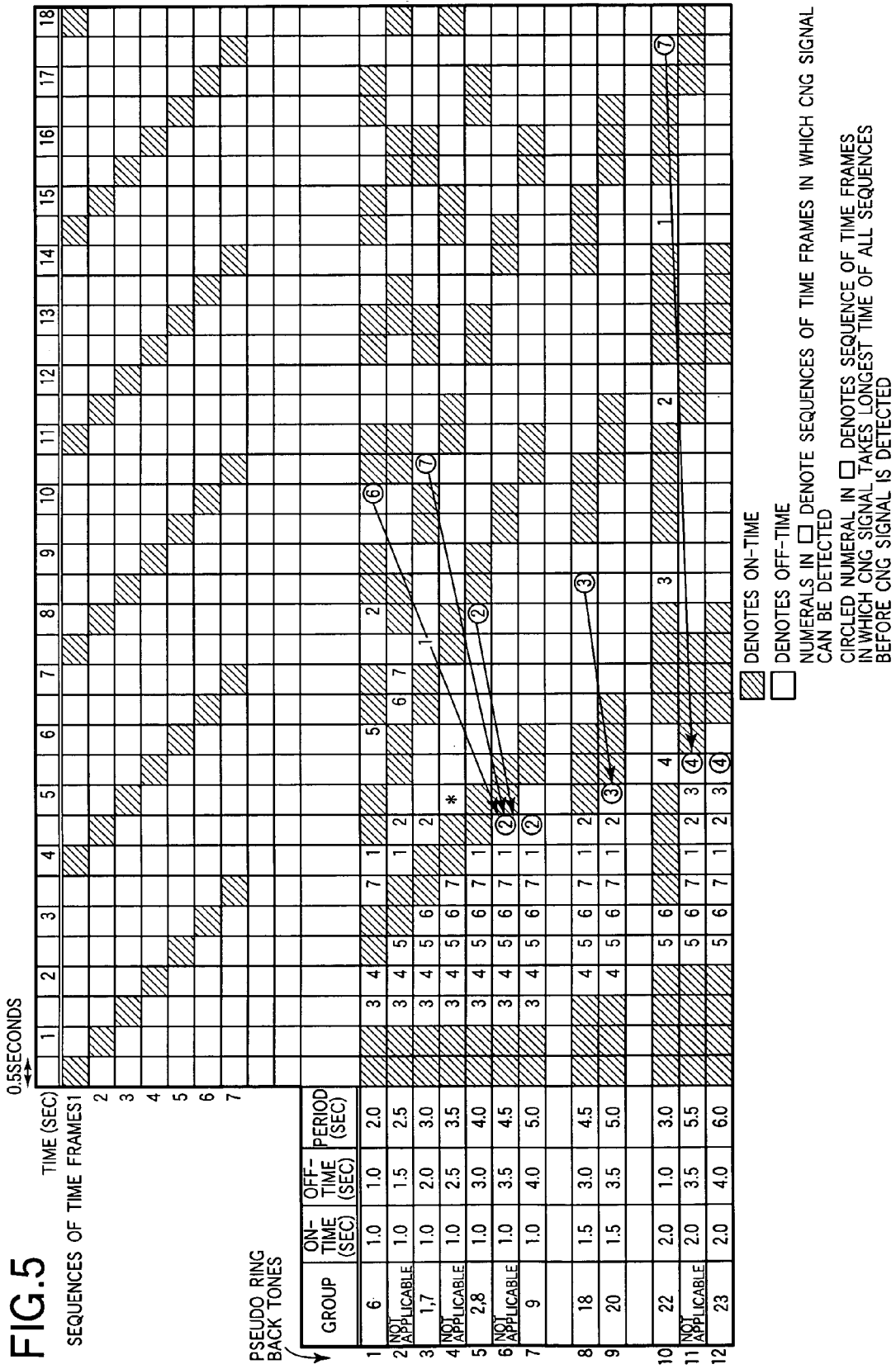
FIG. 5 illustrates the relationship between sequences of time frames of CNG signals and pseudo ring back tones of the invention.

FIG. 5 illustrates the relationship between sequences of time frames in which the CNG signals are transmitted and the pseudo ring back tones according to the present invention. The specific example of the aforementioned processing will be described with reference to FIG. 5. According to the first embodiment, the ON time of a searched ring back tone for a corresponding country or area is set to the pseudo RBT generator 19. If the OFF time is less than 3.5 seconds which is equal to the period of the CNG signal, then the OFF time is automatically set to 3.5 seconds to the pseudo RBT generator 19. If the OFF time is equal to or greater than 3.5 seconds, the main controller 2 sets the OFF time to the pseudo RBT generator 19.

Referring to FIG. 5, Surinam belongs to Group 6 in FIG. 8 and the specified ring back tone is a "2-sec signal" which is on for 1 sec and off for 1 sec. This "2-sec signal" corresponds to pseudo ring back tone #1 in FIG. 9. When the pseudo ring back tone #1 is transmitted, the CNG signal may not be detected for a period of 10 sec from the beginning of the transmission of the pseudo ring back tone #1, if the CNG signal is to be received in sequence of time frames, #6.

Thus, the first embodiment automatically changes the OFF time of the pseudo ring back tone from 1.0 second to 3.5 seconds (This corresponds to the pseudo ring back tone #6), so that the CNG signal may be detected in a maximum of 4.5 seconds. This implies a reduction of time of a maximum of 5.5 seconds. Likewise, for Groups 1 and 7 (FIG. 8), the prior art takes a maximum of 10.5 seconds before the CNG signal is detected. The first embodiment automatically changes the OFF time of the pseudo ring back tone from 2.0 second to 3.5 seconds, so that the CNG signal may be detected in a maximum of 4.5 seconds. This implies a reduction of time by a maximum of 6.0 seconds. Still likewise, for Group 2 and 8 (FIG. 8), the prior art takes a maximum of 8 seconds before the CNG signal is detected. The first embodiment automatically changes the OFF time of the pseudo ring back tone from 3.0 seconds to 3.5 seconds, so that the CNG signal may be detected in a maximum of 4.5 seconds. This implies a reduction of time by a maximum of 3.5 seconds.

Likewise, for Group 18 (FIG. 8), the prior art takes a maximum of 8.5 seconds before the CNG signal is detected. The first embodiment automatically changes the OFF time of the pseudo ring back tone from 3.0 seconds to 3.5 seconds (this corresponds to a time frame #9 of transmission of the pseudo ring back tone), so that the CNG signal may be detected in a maximum of 5.0 seconds. This implies a reduction of time by a maximum of 3.5 seconds. Likewise, for Group 22, the prior art takes a maximum of 17.5 seconds before the CNG signal is detected. The first embodiment automatically changes the OFF time of the pseudo ring back tone from 1.0 seconds to 3.5 seconds (this corresponds to the pseudo ring back tone), so that the CNG signal may be detected in a maximum of 5.5 seconds. This implies a reduction of time by a maximum of 12.0 seconds.

As described above, when an incoming call is intended for a facsimile communication, the communication terminal apparatus automatically enters the facsimile communication mode without allowing the ringer to ring longer than necessary. This alleviates inconvenience to the user. This configuration is also advantageous to the user because the calling party is less billed if the calling party wants to perform a facsimile communication, and because the calling party can hear the periodic pseudo ring back tone at reasonable intervals and is assured that the call is being normally made.

Second Embodiment

A second embodiment differs from the first embodiment in that a user is allowed to give priority to a facsimile communication mode over a voice communication. That is, once the priority FAX mode is set ON, the pseudo ring is prevented from ringing for a predetermined period, for example, the first cycle of the pseudo ring back tone.

The second embodiment has the following features.

(1) An operation menu is displayed on the operation/display unit 5 for the user to select the priority FAX mode.

(2) The programs stored in the NV memory 3 are partially different from those of the first embodiment.

(3) The pseudo ring signal generator 16 includes a delay circuit that delays the generation of the pseudo ring signal by a predetermined time after the pseudo ring signal generator 16 is activated.

The second embodiment will be described in terms of the above items (1)-(3). Elements similar to those of the first embodiment have been given the same reference numerals and their detailed description is omitted.

Figure 6:
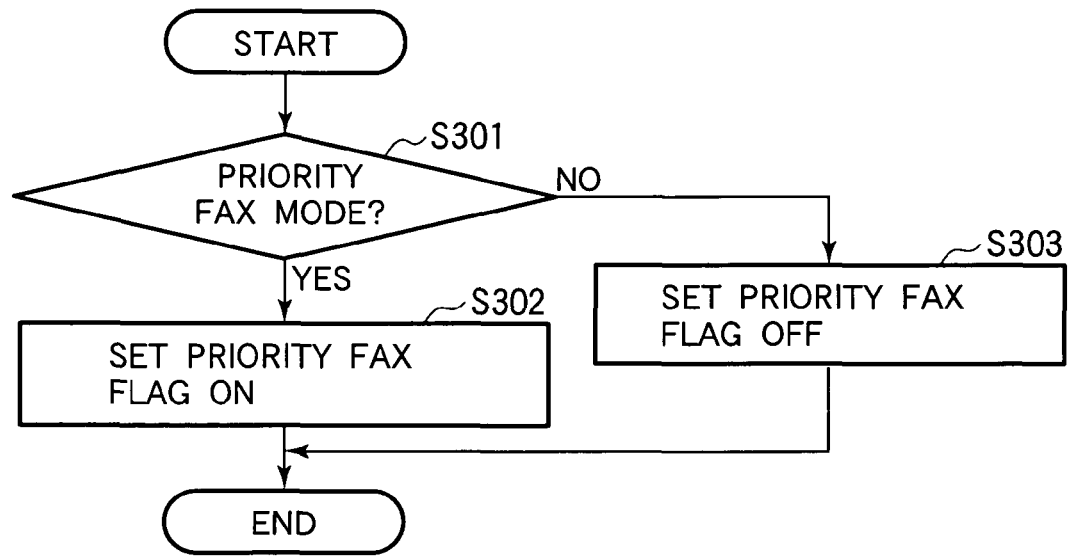
FIG. 6 is a flowchart illustrating the ON/OFF of the priority FAX mode.

FIG. 6 is a flowchart illustrating the ON/OFF of the priority FAX mode. The operation of the ON/OFF of the priority FAX mode will be described with reference to FIGS. 1 and 6. The user is allowed to activate the priority FAX mode if priority should be given to a facsimile communication and to deactivate the priority FAX mode if priority should be given to a voice communication.

Once the user has set the priority FAX mode, the apparatus enters a standby mode. If a facsimile priority mode is selected (YES at S301), a priority FAX mode flag in the NV memory 3 is set ON (S302) so that the facsimile machine is given priority in being connected to the telephone line over the telephone set. If the priority FAX mode flag is not selected (i.e., a voice communication is given priority) (NO at S301), the priority FAX mode flag is set OFF (S303). This completes the flow. The default setting of the priority FAX mode flag is "ON."

The operation for switching an incoming call of the second embodiment is substantially the same as that of the first embodiment (FIG. 2). Thus, a description will be given only of steps different from the first embodiment.

Figure 7:
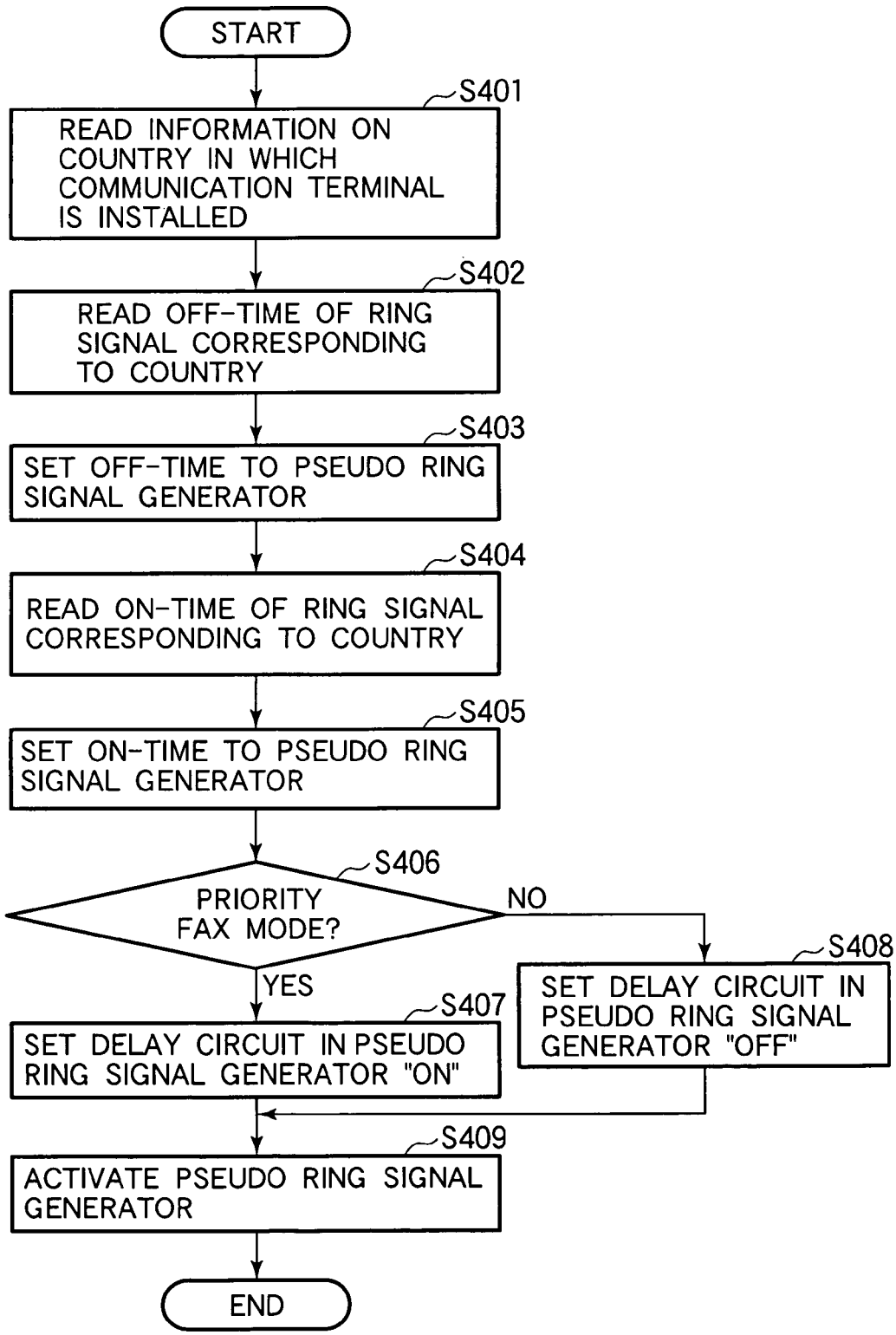
FIG. 7 is a flowchart illustrating the operation for setting the ON and OFF times of the pseudo ring at step S5 of FIG. 2 and for activating the pseudo ring signal generator.

FIG. 7 is a flowchart illustrating the operation for setting the ON and OFF times of the pseudo ring signal at step S5 of FIG. 2 and the operation for activating the pseudo ring signal generator 16.

Steps S401-S405 are the same as steps S201-S205 (FIG. 4) of the first embodiment. Likewise, step S409 is the same as S206 (FIG. 4).

At steps S401-S405, the ON and OFF times of the pseudo ring signal are set to the pseudo ring signal generator 16. Then, the priority FAX mode flag is read and a check is made to determine whether the priority FAX mode flag is ON. If the priority FAX mode flag is ON (YES at S406), the delay circuit in the pseudo ring signal generator 16 is made ON (S407). Then, the program proceeds to step S409. If the priority FAX mode flag is OFF (NO at S406), the delay circuit is set OFF (S408). Then, the program proceeds to step S409.

The delay time of the delay circuit has been set to a predetermined value. When the delay circuit is made ON, the delay circuit delays the generation of the pseudo ring signal by the predetermined amount of time after the pseudo ring signal generator 16 is activated at S409.

As described above, the communication terminal apparatus of the second embodiment allows the user to make the priority FAX mode either ON or OFF at will. Thus, when the apparatus is in the priority FAX mode, the ringer may be prevented from ringing for a predetermined time period after an incoming call is received. This increases the chance of the CNG signal being detected before the pseudo ring signal begins to drive the ringer. As a result, facsimile communications may be automatically received while the user does not hear the ringing. This is advantageous to a user who receives facsimile communications frequently because the user may be prevented from hearing the annoying frequent ringing.

The invention being thus described, it will be obvious that the same may be varied in many ways. Such variations are not to be regarded as a departure from the scope of the invention, and all such modifications as would be obvious to one skilled in the art intended to be included within the scope of the following claims.

What is claimed is:

1. A communication terminal apparatus connected to a single telephone line and is configured to be selectively connected either to a telephone set for voice communication or to a facsimile machine for facsimile communication, the communication terminal apparatus comprising:
    a pseudo ring back tone generator that generates a pseudo ring back tone, the pseudo ring back tone being periodically repeated and transmitted to a calling party in response to an incoming call;
    a pseudo ring signal generator that generates a pseudo ring signal for driving a ringer of the telephone set to ring in response to the incoming call;
    a tone detector that detects a CNG signal indicative that the incoming call is a facsimile;
    a controller that controls at least said pseudo ring back tone generator and said pseudo ring signal generator;
    a table that includes information correlating OFF times of a plurality of ring back tones with corresponding countries;
    wherein if the controller judges an OFF time of a ring back tone for a country to be less than a period of a CNG signal by referring to the table, said controller sets the period of the CNG signal as the OFF time of the pseudo ring back tone to said pseudo ring back tone generator and causes said pseudo ring back tone generator to transmit the pseudo ring back tone.

2. The communication terminal apparatus according to claim 1, wherein the pseudo ring back tone and the ring back tone are repetitive signals which are ON for a preceding period and OFF for a following period, wherein the preceding period of the pseudo ring back tone is equal to that of the ring back tone for the country.

3. The communication terminal apparatus according to claim 2, wherein the following period of the pseudo ring back tone is equal to 3.5 seconds.

4. The communication terminal apparatus according to claim 1 further comprising a selector that makes a decision as to which of the facsimile machine and the telephone set has priority in being connected to the telephone line over the other, wherein if the facsimile machine has priority in being connected to the telephone line over the telephone set, the controller controls the ringer not to ring for a predetermined period of time after reception of the incoming call.

5. The communication terminal apparatus according to claim 1 further comprising a hook-up detector that detects a hook-up condition of the telephone set, wherein if said tone detector fails to detect the CNG signal for a predetermined period of time after reception of the incoming call or said hook-up detector fails to detect the hook-up condition for a predetermined period time after reception of the incoming call, then facsimile communication is performed.

\* \* \* \* \*